United States Patent Office 3,163,548
Patented Dec. 29, 1964

3,163,548
CARBON PAPER INK CONTAINING AN ISOCYA-
NATE MODIFIED, AMINE TREATED, OXIDIZED
NON-BENZENOID HYDROCARBON WAX
Fred J. Stark, Jr., Kirkwood, Mo., assignor to Petrolite
Corporation, Wilmington, Del., a corporation of
Delaware
No Drawing. Filed May 22, 1961, Ser. No. 141,927
19 Claims. (Cl. 106—31)

This invention relates to a process of reacting an oxidized hydrocarbon wax first with ammonia or an amine and then with an organic compound containing a plurality of separate and distinct groups having the formula —X=C=Y, wherein X is C or N and Y is O, S, or NR wherein R is hydrogen or a hydrocarbon radical, preferably where said organic compound is an isocyanate, such as a polyisocyanate, and most preferably a diisocyanate. This invention also relates to the products formed by this process, and to the use of said products, for example, in carbon paper inks, and elsewhere.

In Patent 2,890,125 there is described a process of treating oxidized hydrocarbon waxes with an organic compound containing a plurality of the above mentioned —X=C=Y groups, the products formed, and to the use of such products in carbon paper inks and elsewhere. Patent Number 2,890,124 relates to similar processes, products, and uses except that solvent-extracted oxidized microcrystalline wax is employed as the oxidized hydrocarbon wax to yield an improved product.

I have now discovered that the products described in the above patents can be unexpectedly improved by reacting oxidized wax first with ammonia or an amine (hereafter this treatment is also referred to generally as "amidifying" or "amidification" and the product as "amidified") and then reacting the amidified product with an organic compound as exemplified by the polyisocyanates.

The difference between this process and that described in U.S. Patents 2,890,124–5 is that oxidized wax is amidified in the present process whereas amidification is omitted in the above patents. All other steps are essentially the same. The differences may be summarized as follows:

I. Process 2,890,124–5

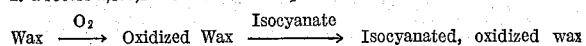

II. Present Process

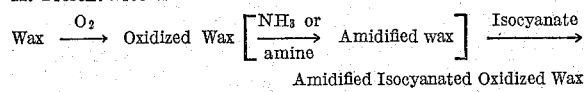

The bracketed portion indicates the difference between the two processes. In general, all steps prior and subsequent to amidification are carried out essentially in the manner described in U.S. Patents 2,890,124–5. However, amidified then isocyanated oxidized wax is unexpectedly superior to the corresponding unamidified products described in 2,890,124–5.

OXIDIZABLE HYDROCARBON WAXES

Oxidized hydrocarbon waxes which can be used for the purposes of this invention are varied and a partial list of such hydrocarbons which can be oxidized include such waxes as plastic microcrystalline wax, tank bottom derived microcrystalline wax, paraffin wax, scale wax, Fischer-Tropsch wax, ozokerite, Utah wax, various types of polyethylene, polypropylenes, etc.

The preferred types of hydrocarbon wax are the hard waxes having a melting point between 170° F. to 220° F. Waxes which can be found within this range and with the desired hardness are microcrystalline wax, Fischer-Tropsch wax, and some of the polyethylenes.

One of the more desirable starting materials for the manufacture of an oxidized hydrocarbon wax is tank bottom derived microcrystalline wax. The collecting of tank bottom waxes is conducted principally in the middle western oil fields such as in Kansas, Oklahoma, Louisiana and Texas, as well as elsewhere to a lesser degree. The production of microcrystalline wax from tank bottoms is well known and has been described in the literature. (See, for example, U.S. Patent No. 2,443,840, dated June 22, 1948, to Stossel.) These waxes are currently being produced by at least two companies and have a melting point ranging from about 170° to 200° F. They contain essentially long chained normal and branched paraffins containing from 30 to 100 carbon atoms per molecule with perhaps some naphthenic type compounds. They range in color from white to a dark brown, but it is preferably to oxidize a wax having a pale yellow color for economical reasons and for ease of oxidation.

Another desirable starting material is the plastic microcrystalline wax of higher melting point which is derived from various lube oil stocks and petrolatums. This type of wax has been well described in the article on "Microcrystalline Waxes, Their Manufacture, Properties and Uses in the Paper Industry," by Bruce H. Clary, in The Industry and Paper World of February 1956. These waxes are more plastic than the tank bottom derived microcrystalline waxes and are composed probably to a large extent of highly branched and naphthenic type hydrocarbons of high molecular weight. These waxes are manufactured and sold by numerous companies and are well known articles of commerce.

Another suitable hydrocarbon wax is the Fischer-Tropsch wax. The Fischer-Tropsch waxes have been described in the literature. (See, for example, Chapter 14 in "Fischer-Tropsch Processes," Weil and Lane, Constable & Co., Ltd., London, 1949.) Also, see the paper presented during the 41st annual meeting C.S.M.A., New York, December 7, 1954, by Charles J. Marsel, entitled "Fischer-Tropsch Waxes; Their Production Properties and Uses," and published in Soap and Chemical Specialties, vol 31, No. 2, pp. 131–4, 157, 159 (1954).

The Fischer-Tropsch waxes are high molecular weight paraffins which are similar to the paraffinic waxes derived from petroleum. As a result, the lower molecular weight Fischer-Tropsch waxes are similar to scale wax and paraffin wax. The higher molecular weight ones are somewhat similar to tank bottom derived microcrystalline wax and those of even higher molecular weight are similar to the lower molecular weight polyethylene. The Fischer-Tropsch waxes are composed of mostly straight chain linear paraffins with molecular weights of from about 300 up to 1,000 or 1,500. For the purpose of this invention, it is desirable to use a Fischer-Tropsch wax melting within the range of 80° to 110° C. These waxes will normally have a penetration as defined by the ASTM test method D5–25 of from between 0+ to around 10. All penetrations in this test are expressed in tenths of a millimeter and are obtained using a 100 g. total weight for five seconds at 77° F.

It is also possible and desirable to use the lower molecular weight polyethylenes of which there are about 3 or 4 types. Higher molecular weight polyethylenes may also be used, but because of their higher viscosity it is necessary to blend them with materials such as microcrystalline wax or paraffin wax, etc.

The lower molecular weight polyethylenes which may be used can be prepared by either of three processes. By one process polyethylene is produced as described in U.S. Patent No. 2,504,400, dated April 18, 1950, to Erchak. Said patent characterizes the product in terms of the method of manufacture which is a process for the production of at least medium hard, high-melting waxes from ethylene which comprises maintaining ethylene under pressures between about 425 and 475 atmospheres and at temperatures about 140° C. and 200° C. in contact with isopropanol in amount sufficient to occupy from about 5% to about 10% of the total volume of the reaction zone and containing from about 0.1 to about 2% by weight on the isopropanol of hydrogen peroxide on a 100% hydrogen peroxide basis. Polyethylenes can be made by this process having molecular weights from around 1,000 up to around 10,000 or higher. The lower molecular weight polyethylenes produced by this process are of low enough viscosity so that it is not necessary to blend in lower molecular weight hydrocarbons. However, the higher molecular weight materials such as those having molecular weights of around 2,000 and higher must be blended with lower molecular weight waxes such as paraffin wax, microcrystalline wax, etc.

A second type of polyethylene is that described by Ziegler in numerous patents such as U.S. Patent No. 2,699,457, dated January 11, 1955. These polyethylenes may have molecular weights such that the products are liquids on up to around 50,000 and higher. Those materials produced by this process which are wax-like in characteristics on up to materials having molecular weights of several thousand may be used without blending while those of higher molecular weight must be blended with lower molecular weight waxes for the purposes of this invention. This particular type of polyethylene is produced by polymerizing ethylene in the presence of an aluminum or certain other metal alkyl or hydride catalyst using lower pressures and temperatures. Polyethylenes made by this process are very crystalline, are hard and brittle and are considerably less flexible than the conventional polyethylenes. They have a density of approximately 0.95 whereas conventional polyethylenes will have a density of approximately 0.92.

Another polyethylene which is similar to that just described is that which is described by the Phillips Petroleum Company's Belgian Patent No. 530,617, dated July 22, 1954. This polyethylene is produced using a catalyst composed of chrome oxide on a silica alumina support and the physical properties of the product are very similar to those produced by the Ziegler process. See also the three papers on Marlex catalyst systems, molecular structure, and properties appearing in the preprints of the general papers of the Division of Petroleum Chemistry of the American Chemical Society, of February 1956, pp. 211–240.

The commercial polyethylenes (i.e., those that have been known for many years and which are well described in Kirk-Othmer, Encyclopedia of Chemical Technology, volume 10, pp. 938 through 957) may be used for the purposes of this invention when blended with lower molecular weight waxes. These polyethylenes are described by FIGURE 1 on page 941 of the just-mentioned reference.

Other polyethylenes, intermediate in properties between the high density, high crystalline polyethylene described by Ziegler and Phillips Petroleum Company and the conventional polyethylene produced by high pressure process may be used. One such polyethylene can be produced in conventional high pressure equipment used for making conventional polyethylene, by slight modifications of reaction conditions.

Materials such as polypropylene may also be used especially the solid wax-like polypropylenes which are crystalline in nature. It is best in many cases to blend these materials with other waxes. Polybutylene may also be employed, but generally where it is used it is necessary to blend it with other waxes such as microcrystalline wax, etc.

For purposes of this invention, it is also possible to use paraffin wax derived from petroleum. This wax is a well known article of commerce and is well described in "The Chemistry and Technology of Waxes," by Warth, published by Reinhold, 1947, pp. 217 to 239. Because of the low molecular weight and softer characteristic of this wax, it is generally necessary to blend it with other waxes and/or polyethylene of higher molecular weight and greater hardness.

It is also possible to use natural hydrocarbon waxes which are mined in this country and in other parts of the world. These go under such names as ozokerite, Utah wax, etc. These waxes are very plastic and in that respect closely resemble the plastic microcrystalline waxes derived from lube oil stocks and petrolatums. These waxes are described in the above-mentioned book by Warth, particularly on pages 195 to 202.

It is obvious that one can use blends of the above materials as the starting material for this invention, or one can make slight modifications which would involve processes such as solvent extraction to either harden or soften the wax or wax blends, or hydrogenation to remove unsaturation or to perhaps break naphthenic rings, or cracking to produce unsaturation, or polymerization of any unsaturates which may be present, etc.

Any of the above essentially non-benzenoid hydrocarbon waxes can be used as well as others of this type not mentioned, if they fulfill certain criteria. The hydrocarbon material is solid at a temperature of approximately 120° F. or preferably higher and they must be susceptible to gaseous oxidation using conventional methods including metallic catalysts.

OXIDIZED HYDROCARBON WAXES

The art of oxidizing hydrocarbon waxes, for example the oxidizable hydrocarbon waxes described herein is well known and has been extensively discussed in the literature. A wide variety of hydrocarbon waxes and comparable compounds principally hydrocarbon in nature including microcrystalline waxes and a variety of comparable compounds principally paraffinic in nature have been subjected to oxidation in various manners and particularly by the use of air, ozone, or oxygen in the presence of an oxidation catalyst, such as a wax soluble organic salt such as manganese or cobalt naphthenate. Other ways of oxidizing microcrystalline waxes involve the use of materials such as the oxides of nitrogen and various chemical oxidizing agents such as chromic acid, hypochlorous acid, nitric acid, etc. Also, waxes of this type can be subjected to very mild forms of oxidation such as cracking and the cracked products may be subjected to oxidation by such methods as the Oxo process, or other types of oxidations to introduce oxygen-containing functional groups such as carboxylic acids, alcohols, esters, etc.

For convenience, and for reasons of economy, it is preferred to carry out the oxidation by blowing with an oxygen containing gas at temperatures ranging from 240° to 340° F. for a sufficient length of time to give an appreciable acid and saponification number. This oxidation is preferably carried out in the presence of a catalyst such as a soluble cobalt or a manganese soap; such as a stearate, oleate, naphthenate, etc. Also, wax insoluble catalysts may be used such as potassium permanganate. These catalysts are used in concentrations ranging from 0.2% to 2%. Sometimes, no catalyst is required, especially if the microcrystalline wax is pretreated with a metal halide such as aluminum chloride, or if the oxidation is catalyzed by previously oxidized wax. Sometimes it may be of some advantage to add a chlorinated paraffin or a blown drying oil before or during the oxidation.

This oxidation procedure can be carried out in manners described in numerous patents, such as U.S. Patents No. 2,249,708, dated July 15, 1941, to Hicks-Bruun; U.S. Patent No. 2,486,454, dated November 1, 1949, to Zellner; U.S. Patent No. 2,573,422, dated October 30, 1941, to Fish; and U.S. Patent No. 2,674,613, dated April 6, 1954, to Nelson. Also, the three-part article entitled "Oxidation of Paraffins," by Ernest Stossel in the Oil &

Gas Journal, vol. 44, No. 11, pp. 130–9; No. 15, pp. 145–51; No. 17, pp. 69–77 (1945), should be especially noted and also the 121 references in this article.

In general, it is preferred to oxidize the microcrystalline wax to a degree such that the oxidized wax will have an acid number of from 10 to 60 and a saponification number of from 30 to 150. A more preferred range for the acid number is from 20 to 40 and for the saponification number from 50 to 100.

Following are examples which show to a certain extent how an oxidized microcrystalline wax may be produced.

*Example 1a*

To 300 grams of a microcrystalline wax obtained from the settlings of East Texas Crude, having a melting point of 190° F.–195° F., a penetration of 3 (ASTM test method D5–25) and a light yellow color is added 1.5 grams of cobalt stearate. The resultant mixture is blown with air at a rate of 5 ml./g./min. until the product shows an acid number of 15. This oxidation is carried out at 290° F. and takes from two to sixteen hours to achieve, depending upon the degree of dispersion of the air. Using a fine screen as a disperser, the time of oxidation is about twelve hours and the product is colored yellow and has a saponification number of 50, a melting point of 180° F. and a penetration of 5.

*Example 2a*

To 300 grams of microcrystalline wax obtained from the settlings of East Texas Crude, having a melting point of 190°–195° F. is added 1.5 grams of manganese naphthenate. This resultant mixture is blown with air at a rate of 5 ml./g./min. at 320° F. until the product has an acid number of 10. The temperature is then lowered to 270° F. and air blowing is continued until the product shows an acid number of 23. By the use of a screen disperser, the time required for this oxidation is fifty hours and the product has a melting point of 180° F., a saponification number of 60 and a penetration of 5. (ASTM test method D5–25.)

Examples 3a, 4a, 5a and 6a were carried out in the manner of Examples 1a and 2a to yield the products shown in Table A.

These oxidations can be continued for even a longer period of time to give products having acid numbers up to 60 and saponification numbers up to 150. These products are all useful for the purpose of this invention. Higher temperatures may be used for this oxidation; however, the products in the invention will then be a little softer and darker in color.

Furthermore, dark colored microcrystalline wax or waxes bleached to a white color may be used. Also, lower air rates may be used, but in this case a greater degree of polymerization is encountered, and in certain instances, if this is carried to excess, very viscous products may be obtained upon amidification followed by reacting with an isocyanate. Air rates may be increased up to 10 or 15 or even high ml./g./min. to achieve faster oxidation or the air dispersion may be increased by use of mechanical stirring, or by using a disperser which gives very fine gas bubbles. By these latter procedures, good products may be obtained for the purposes of this invention. Many other modifications in the method of oxidation may be made as suggested in the patent literature.

The above examples describe oxidation processes using tank bottom derived microcrystalline waxes. The same general procedure can be used with other hydrocarbon waxes.

Normally, it is possible to oxidize Fischer-Tropsch waxes using the same procedure as described above for microcrystalline wax. Following is an example using a Fischer-Tropsch wax.

*Example 7a*

To 300 g. of a Fischer-Tropsch wax having a melting point (capillary tube) of 212° F., a penetration (ASTM test method D5–25) of 4, an acid number, saponification number and hydroxyl value less than 1, a density of 68° F. of 0.925, and a white color, is added 1.5 g. of cobalt naphthenate. This mixture is oxidized at 290° F. to an acid number of 11 and then at 245° F. until the product has an acid number of approximately 26. The air rate (2–5 cc./g./min.) is adjusted so that the acid number increased at a rate of 0.5–0.8 acid number per hour. The product has an NPA color of 3½, a penetration (ASTM test method D5–25) of 10, a melting point (ASTM test method D127–30) of 205° F., an acid number of 26, a saponification number of 65.

Example 8a shown in Table A is oxidized in a similar manner.

Other Fischer-Tropsch waxes of higher or lower molecular weight may be easily oxidized using the same procedure.

*Example 9a*

A Fischer-Tropsch wax having a melting point (capillary tube) of 221° F., a penetration (ASTM test method D5–25) of 1, an acid number, saponification number, and hydroxyl value of 0, a density at 68° F. of 0.933 and a white color, is oxidized as described in Example 7a to yield an oxidized product having an NPA color of 3½, a penetration (ASTM test method D5–25) of 4, a melting point (ASTM test method D127–30) of 201° F., an acid number of 23, and a saponification number of 68.

When waxes of lower molecular weight are used it is oftentimes possible to achieve oxidation at a lower temperature whereas with higher molecular weight compounds it is oftentimes necessary to go to higher temperatures. Also, as pointed out before, blends of various hydrocarbon waxes or other materials may be advantageously oxidized. Following are several examples in which blends of microcrystalline wax or paraffin wax with polyethylene are oxidized to give desirable products for use in the next section.

*Example 10a*

To 225 g. of a paraffin wax (56° C. melting point) is added 175 g. of a 2100 molecular weight polyethylene produced in the manner as described in the aforementioned U.S. Patent No. 2,504,400 (melting point of 102° C. and a penetration of 3). The resultant mixture is heated to approximately 220° F. for one-half hour at which time a homogeneous mixture is obtained and shows no separation of constituents when cooled to room temperature. Air is blown through this mixture heated to 300° F., at a rate of approximately 5 ml./g./min. until acid number reaches approximately 17 (about 45 hours). Shortly after the air blowing procedure starts, there is added to the reaction mixture 2 g. of potassium permanganate in the form of an aqueous solution; a solution of 5% concentration. Rapid agitation is used so as to obtain fine dispersion of the insoluble catalyst thus formed in the wax mixture. By the use of this procedure, a light orange hard emulsifiable wax is obtained having a saponification value of 50.

*Example 11a*

To 300 g. of tank bottom derived microcrystalline wax (190–195° F. melting point and a penetration of 3) is added 68 g. of a conventional polyethylene (average molecular weight approximately 20,000) and 32 g. of a polyethylene having an average molecular weight of 2100 and produced as described in U.S. Patent No. 2,504,400 (melting point of 102° C. and a penetration of 3). The resultant mixture is heated to approximately 320° F. for two hours at which time a homogeneous blend is obtained. To this material is added 2 g. of cobalt naphthenate and the temperature lowered to 290° F. Air is introduced at this temperature at a rate of approximately 3 ml./g./min.

until an acid number of 17 is obtained. The time required for this oxidation is approximately 60 hours and the product will have a saponification number of 51, a melting point of 198° F., and a penetration of 3.

It should be borne in mind that all the above examples should not be meant to limit the scope of this invention. Any of a number of oxidation procedures can be used and any of a number of hydrocarbon materials previously described may be used. The main criteria for the purpose of this invention is that the wax be oxidized to a product having sufficient acid and saponification value, so that they may be reacted with ammonia or amines and then reacted with an isocyanate and that the final product be preferably homogeneous. In general, it is found that the wax, to be sufficiently oxidized, should be oxidized such that it shows an acid value of at least 10 and a saponification value of at least 30. On the other hand, the wax preferably should not be oxidized to too great an extent; otherwise, the final product may be too soft or viscous for the desired purposes. For optimum results, it is best to have an upper value for the acid number of 60 and for the saponification value of 150. It has been found that, even soft oxidized products can be materially improved by the reaction of the amidified oxidized wax with an isocyanate, but it is generally better to use a harder oxidized wax if it is economically feasible.

The above described oxidized products may be further improved or modified by various blending processes. For example, numerous oxidized waxes described above may be blended with each other to obtain certain desirable features or they may be blended with unoxidized hydrocarbon waxes to a certain extent.

In addition to the waxes described in the above examples, other hydrocarbon waxes capable of being oxidized can be employed. Although waxes of certain acid and saponification numbers are preferred, essentially all waxes are improved by the present process. Thus, the present process includes all oxidized hydrocarbon waxes.

The above examples are illustrative of the general manner in which oxidation is carried out. The variables of catalyst, air flow rate, temperature, degree of dispersion of air, and the amount naturally occurring oxidation inhibitors, etc., determine the exact nature of the oxidation products. Oxidized waxes with the same or nearly the same acid numbers and saponification numbers are not necessarily the same in terms of chemical composition, for example some of these acids and esters may contain keto groups which are not reactive under acid and saponification number determinations. Hence, upon subsequent treatment of the oxidized waxes with amines or ammonia in the process of amidification, oxidized waxes having the same acid and saponification number may give different products.

A summary of representative oxidized waxes is presented in the following table:

fication number of at least 30, since oxidized waxes are amidified and since both acid and ester groups react with ammonia or amines to form amides, it is possible to produce amides from oxidized waxes having values of less than these minimum acid and saponification figures, for example, waxes having an acid value of 0 provided that the product has a saponification value, for example of 10, 20 or 30, etc. Similarly it is theoretically possible to produce amides from oxidized waxes having a saponification number of 0 provided the product has an acid number, for example of 10, 20, 30, etc.

SOLVENT EXTRACTED OXIDIZED WAXES

The oxidized waxes described above can be extracted by numerous solvents to give products which may then be reacted in the manner of this invention to yield valuable products. The oxidized waxes described herein may be used as well as any of countless others produced by similar means from any of a number of different grades of waxes such as tank bottom derived microcrystalline wax. The art of solvent extracting an oxidized wax is well known in the art and has been described in the patent literature, see for example, U.S. Patent No. 1,823,983, dated September 22, 1931, to Luther et al.; U.S. Patent No. 1,863,004, dated June 14, 1932, to Burwell; U.S. Patent No. 1,909,295, dated May 16, 1933, to Luther et al.; U.S. Patent No. 2,424,671, dated July 29, 1947, to Stossel, and U.S. Patent No. 2,698,336, dated December 28, 1954, to Nelson, etc.

In general, the solvent extraction procedure can be conducted by first dissolving the oxidized wax in a suitable solvent at some temperature below or at the boiling point of the solvent. This homogeneous mixture is then cooled to a temperature at which the oxidized wax is only partially soluble and the precipitated wax can then be removed by a filtration process. The precipitated wax, if so desired, can be washed on the filter with additional solvent or may be repulped with clean solvent, preferably at the temperature of filtration, and then refiltered.

For sake of convenience, it is advantageous to choose a solvent which dissolves the wax at a temperature of around 130°–200° F. and one that will yield a good fractionation at temperatures between 50°–100° F. In general, it is most convenient to filter the wax at room temperature, i.e., approximately 70°–95° F. It is also important to choose a solvent which yields a wax precipitate which can be readily recovered by filtration. Oftentimes, the rate of cooling in addition to the nature of the solvent will have an effect upon the ease of filtration of the wax precipitate.

By this general procedure the wax is divided into two fractions; one fraction being of greater hardness, higher melting point, and, in general, having a lower saponification number. For the purposes of this invention, this represents a desirable fraction. The second fraction is

TABLE A

| Ex. | Initial Wax | | | Oxidation Product | | | |
|---|---|---|---|---|---|---|---|
| | Type | M.P. | Penetration No. | Acid No. | Saponification No. | Melting Point, °F. | Penetration No. |
| 1a | Microcrystalline | 190–195° F | 3 | 15 | 50 | 180 | 5 |
| 2a | do | 190–195° F | 3 | 23 | 60 | 180 | 5 |
| 3a | do | 190–195° F | 3 | 36 | 80 | 180 | 6 |
| 4a | do | 190–195° F | 3 | 24 | 55 | 180 | 7 |
| 5a | do | 190–195° F | 3 | 15 | 45 | 180 | 5 |
| 6a | do | 190–195° F | 3 | 30 | 65 | 180 | 5 |
| 7a | Fischer-Tropsch | 212° F | 4 | 26 | 65 | 205 | 10 |
| 8a | do | 212° F | 4 | 12 | 37 | 210 | 5 |
| 9a | do | 221° F | 1 | 23 | 68 | 201 | 4 |
| 10a | {Paraffin / Polyethylene} | {56° C / 102° C} | 3 | 17 | 50 | | |
| 11a | {Microcrystalline / Polyethylene} | {190–195° F / 102° C} | 3, 3 | 17 | 51 | 198 | 3 |

Although, in general, the oxidized waxes employed herein have an acid number of at least 10, and a saponisofter, has a lower melting point and, in general, has a higher saponification number and is not as useful for the purposes of this invention. A given solvent is chosen so that under a given set of experimental conditions a yield of the solvent insoluble precipitated oxidized wax of from 50 to 75 percent is obtained.

It is often noted, especially in waxes which have been oxidized to a greater extent, that the wax is not completely dissolved in certain solvents; for example, hexane, at elevated temperatures, but rather gives a mixture which appears hazy or cloudy. This is presumably due to the presence of hydroxy acids and, if desirable, this cloudy mixture can be filtered to remove these hydroxy acids. Generally, it has been found that when this insolubility occurs there appears to be only a small amount of this type of material formed in the oxidation, for example, less than several percent. It is not necessary to remove these compounds, for these materials do not seem, at least in these small concentrations, to add or detract qualities in the final product.

In carrying out the extraction process it has been found that, in dissolving the wax in the solvent at elevated temperatures, it is easier to add the molten wax into the solvent with agitation. If all the wax does not go into solution at the particular temperature, the wax is finely divided and will be more readily dissolved than adding solid chunks of wax. This latter procedure is most advantageous when a solvent is used having a boiling point below the melting point of the oxidized wax.

For the sake of convenience, it is best to use approximately 4 to 15 parts by volume of solvent to one part of wax, although higher or lower percentages can also advantageously be used. In choosing the solvent, it is most convenient to use one having a boiling point less than 300° F. but above 130° F. although solvents outside this range can be used.

When a hydrocarbon solvent is used the two fractions so obtained have acid and saponification numbers which are more nearly alike than those obtained when more polar solvents such as alcohols, esters, ketones, etc. are used. When these latter solvents are used they will preferentially dissolve the oxygenated material in the wax to yield a soft fraction which has a considerably higher saponification number than that obtained by use of the hydrocarbon solvents. Therefore, it is best, but not necessary, to use an oxidized wax which has been oxidized to a greater extent when they are extracted with a polar solvent.

Numerous solvents, or a mixture of solvents, may be used for the purposes of this invention. The important criteria for a solvent are that it be essentially nonreactive with the oxidized wax and that it dissolves the wax at an elevated temperature and then allow wax to be precipitated from it in cooling so that approximately one-fourth to one-half of the wax remain in solution. Yields of precipitated insoluble wax of less than 50 percent can be obtained and useful products may be produced from these but the process is then less economical, and for this reason it is preferred to stay within the cited range. Among those solvents which can be used are the low boiling hydrocarbons such as pentane, hexane, heptane, octane, cyclohexane, petroleum ether, naphtha, benzene, toluene, etc.; the lower boiling alcohols such as ethanol, propanol, butanol, etc.; the lower ketones such as acetone, methylethyl ketone, methylisobutyl ketone, cyclohexanone, etc.; the lower esters such as methyl acetate, ethyl acetate, etc.; chlorinated hydrocarbons such as chloroform, carbon tetrachloride, ethylene dichloride, ethers such as ethyl ether, isopropyl ether, etc.; acids such as acetic acid, propionic acid, etc.; and other materials such as dimethyl formamide, dimethyl sulfoxide, pyridine, etc.

One skilled in the art could name other solvents which would be satisfactory for purposes of this invention and the above list should not be construed to limit the scope of this process. The following examples will describe more specifically the solvent extraction of oxidized waxes.

*Example 3b*

To 1.2 liters of n-hexane at 55° C. is added with rapid agitation 300 g. of molten oxidized wax prepared as described in 3a. The resulting solution is heated to reflux, and then cooled to room temperature. The precipitated wax is then removed by filtration and the wax cake washed with 500 ml. of fresh n-hexane at room temperature. After drying, a yield of 60% is obtained having a penetration number of 4, an acid number of 30, and a saponification number of 55.

*Example 6b*

Example 3b is repeated with the oxidized wax of Example 6a with a 60% yield of a solvent extracted precipitated wax having a penetration number of 3, an acid number of 24, and a saponification number of 50.

*Example 7b*

Example 3b was repeated with the oxidized wax of Example 7a with a 65% yield of a solvent extracted precipitated wax having a penetration number of 0.33, an acid number of 20, and a saponification number of 55.

*Examples Employing Oxygenated Solvents*

The waxes in the above Examples 3b, 6b, and 7b are also extracted with isopropyl alcohol, acetone, ethyl acetate in ratios of 10 liters of solvent per kilogram of wax to give yields of over 70% of solvent extracted oxidized waxes.

A summary of representative solvent-extracted oxidized waxes is presented in the following table:

TABLE B

| Ex. | Initial Oxidized Wax | | Solvent | Percent Yield | Penetration No. | Acid No. | Saponification No. |
|---|---|---|---|---|---|---|---|
| | Type | Ex. | | | | | |
| 3b | Micro | 3a | Hexane | 60 | 4 | 30 | 55 |
| 6b | Micro | 6a | ___do___ | 60 | 3 | 24 | 50 |
| 7b | Fischer-Tropsch | 7a | ___do___ | 65 | 0.33 | 20 | 55 |

AMIDIFICATION

Amidification is carried out with ammonia or an amine which when reacted with oxidized wax yields a product capable of further reaction with an isocyanate. In general, this includes an amine whose resultant amide contains active hydrogen, i.e. hydrogen capable of further reaction with an isocyanate. In the case of monoamines this includes an amine of the formula

where R is a substituted group which may or may not contain an active hydrogen and R' is hydrogen or a substituted group which contains an active hydrogen capable of reacting with an isocyanate. Examples of R include methyl, ethyl, propyl, butyl, amyl, hexyl, etc., including both straight and branched chain compounds of the $C_nH_{2n+1}$-series; aryl groups, such as phenyl, etc.; hydroxy containing group of this series, i.e. $HOC_nH_{2n}$-; polyalkylene ether alcohol groups, i.e. $H(OC_nH_{2n})_x$-, etc. Examples of R' include $HOC_nH_{2n}$-, $H(OC_nH_{2n})_x$-, etc.

Examples of polyamines include the polyalkylene amines, for example of the formula

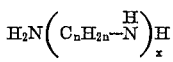

where $x$ is an integer, for example, 1–4 or greater; the alkylated derivatives thereof; the oxyalkylated derivatives thereof; the oxyalkylated, alkylated derivatives thereof, aryl polyamine for example phenylene diamine, etc. with the proviso that the above polyamines are amidifiable and that the amidified product be reactive with the isocyanate.

Because of reactivity, cost, and superior products, oxidized wax amidified with ammonia is the preferred embodiment of this invention and will be used to illustrate the present invention.

Oxidized wax is treated with ammonia or an amine at a temperature sufficiently high to cause reaction between the oxidized wax and ammonia or the amine but not so high as to decompose the hydrocarbon chain, such as temperature of at least 100–300° C., for example 150–200° C., but preferably from 150–175° C. During reaction with ammonia or the amine it is highly desirable to heat the oxidized wax at a sufficiently high temperature for a sufficient period of time to react with thermally unstable functional groups present on the wax such as keto, ester, etc., groups which with ammonia or amines produce a more thermally stable product.

Depending on the temperature employed, the reaction can be carried out from 30 minutes or less to three or more days, such as from 1 to 24 hours, but preferably from 3 to 12 hours. However, optimum reaction time will depend on, among other things, the temperature employed. Ammonia or amine may be added in any satisfactory manner. In practice, amidification is generally effected by passing gaseous ammonia at the rate of at least 0.01 g./min., such as from 0.01 to 1.0 g./min., for example 0.1 to 0.5 g./min., but preferably 0.02 to 0.1 g./min. into molten oxidized wax heated to at least about 150° C., but preferably about 150–175° C. for a period of at least three hours, but more preferably 3–6 hours. Economics dictates the amount of maximum ammonia or volatile amine flow. Although the reaction can be carried out under superatmospheric pressure, optimum results are achieved at atmospheric pressure since superatmospheric pressure does not allow decomposition of the unstable constituents to occur as readily as effected at atmospheric pressure.

Liquid amines can be added as liquids and solid amines as solids or added as liquids after melting. Alternately they can be dissolved in a suitable solvent and added as solutions.

After reaction excess ammonia or amine is removed by any suitable means, for example, gas entrainment, distillation, reduced pressure, etc. In practice, excess ammonia or amine is removed by blowing with a gas inert with the product such as nitrogen, air, or any other suitable gas.

The nitrogen content of the amidified product will vary depending on the acid number, saponification number, keto value, etc., of the oxidized wax. For optimum results the nitrogen content of the final product should be a value sufficient to indicate complete amidification of all the acid and ester groups present in the wax. Thus, a sufficient amount of ammonia or amine should be added to react with at least all the carboxylic acid groups as determined by acid and saponification numbers, i.e. at least one mole of ammonia or amine per mol-equivalent of each acid and ester group. In addition, a sufficient amount of ammonia or amine should be added to react with unstable groups present in the oxidized wax. However, in practice an excess of ammonia or amine is added, for example, at least two moles or more of ammonia or amine per mol equivalent acid and ester. Employing ammonia, the waxes in general contain at least 0.2% nitrogen, for example 0.3 to 2.0%, such as 0.5 to 1.5%, but preferably 0.5 to 1.0%, by weight.

*Example 1c*

The oxidized microcrystalline wax of Example 1a (1500 g.) is changed to a heated reaction vessel equipped with a stirrer. When the temperature of the wax reaches 155° C., ammonia is passed into the wax through a gas diffuser at the rate of 0.05 g./min. for six hours. Then ammonia addition is stopped and the wax is blown with air for 15 min. to remove excess ammonia.

Additional examples are carried out in the same manner. A summary of these examples is presented in the following Table C.

TABLE C.—AMIDIFICATION

| Ex. | Type | Ex. | Amine | | | | Product, Percent Nitrogen |
|---|---|---|---|---|---|---|---|
| | | | Name | Addition Rate, g./min. | Time, hrs. | Temp. | |
| 1c | Micro | 1a | NH₃ | .05 | 6 | 155° | 0.63 |
| 2c | Micro | 2a | NH₃ | .05 | 6 | 155° | 0.84 |
| 3c | Micro | 3a | NH₃ | .05 | 6 | 155° | 0.96 |
| 4c | Micro | 4a | NH₃ | .05 | 6 | 155° | 0.78 |
| 5c | Micro | 5a | NH₃ | .05 | 6 | 155° | 0.60 |
| 6c | Micro | 6a | NH₃ | .05 | 6 | 155° | 0.88 |
| 7c | Fischer-Tropsch | 7a | NH₃ | .05 | 6 | 155° | 0.80 |
| 8c | do | 8a | NH₃ | .05 | 6 | 155° | 0.62 |
| 9c | do | 9a | NH₃ | .05 | 6 | 155° | 0.59 |
| 10c | Paraffin-polyethylene | 10a | NH₃ | .05 | 6 | 155° | 0.67 |
| 11c | Microcrystalline-polyethylene | 11a | NH₃ | 0.05 | 6 | 155° | 0.65 |
| 3bc | Micro | 3b | NH₃ | 0.05 | 6 | 155° | 0.85 |
| 6bc | Micro | 6b | NH₃ | 0.05 | 6 | 155° | 0.76 |
| 7bc | Fischer-Tropsch | 7b | NH₃ | 0.05 | 6 | 155° | 0.73 |
| 4cc | Micro | 4a | MeNH₂ | 0.8 | 6 | 160° | 0.72 |
| 4ccc | Micro | 4a | EtNH₂ | 0.8 | 6 | 160° | 0.69 |

ORGANIC COMPOUNDS HAVING —N=C=Z GROUPS

Broadly speaking, the materials which can be reacted with amidified, oxidized wax for the purpose of this invention are organic compounds, containing as the sole reacting group a plurality of separate and distinct groups having the formula —X=C=Y, wherein X is C or N and Y is O, S, or NR wherein R is hydrogen or a monovalent hydrocarbon radical. See U.S. Patent No. 2,430,479, dated November 11, 1947, to Burt Carlton Pratt et al.

A preferred subgenus of this invention is that wherein the amidified, oxidized wax is reacted with a compound having a plurality of —N=C=Z groups, wherein Z is a chalcogen (J. Am. Chem. Soc. 63,892 (1941)) of atomic weight less than 33. This subgenus includes the polyisocyanates, the polyisothiocyanates and mixed isocyanate-isothiocyanates having at least one of each of these groups. For convenience of disclosure, the invention will be discussed below largely in terms of the polyisocyanates.

The preferred diisocyanates, diisothiocyanates and mixed isocyanate-isothiocyanates have the general formula ZCN—R—NCZ in which R is a divalent hydrocarbon radical and Z is a chalcogen of atomic weight less than 33.

Examples of other types of —X=C=Y compounds which may be used include carbon suboxide $C_3O_2$, carbon subsulfide $C_3S_2$, diethylenediketene

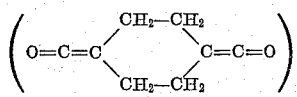

and compounds of formulae:

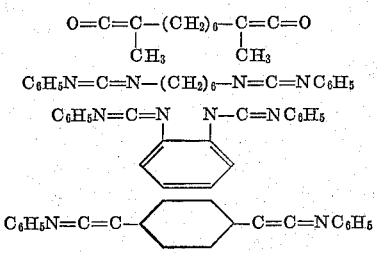

and

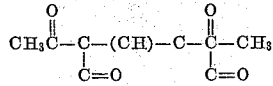

Of the organic compounds described by the above formulae, the most useful, because of their greater availability, reactivity, ease of manufacture, and cost, are the isocyanates or the thioisocyanates, or combinations of these two.

A preferred subgenus of this invention is that wherein the above partial structural formulae represents the polyisocyanates and more specifically the diisocyanates, which of course contain two distinct and separate isocyanate groups. Representative compounds of this subgenus are the polymethylene diisocyanates such as ethylene diisocyanate, trimethylene diisocyanate, tetramethylene diisocyanate, pentamethylene diisocyanate, etc.; the alkylene diisocyanates such as propylene-1,2-diisocyanate, butylene-1,2-diisocyanate, butylene 1,3-diisocyanate, butylene-2,3-diisocyanate; the alkylidine diisocyanates such as ethylidene diisocyanate, butylidene diisocyanate, and heptylidene diisocyanate. The cycloalkylene diisocyanates such as cyclopentylene-1,3-diisocyanate, cyclohexylene-1,2-diisocyanate, cyclohexylene-1,4-diisocyanate; the aromatic diisocyanates such as m-phenylene diisocyanate, p-phenylene diisocyanate, 1-methylphenylene-2,4-diisocyanate, 1-methylphenylene-2,6-diisocyanate, 3,3'-bitolylene-4,4'-diisocyanate, naphthylene-1,4-diisocyanate, naphthylene-1,5-diisocyanate; aliphatic-aromatic diisocyanates such as xylylene-1,4-diisocyanate, xylylene-1,3-diisocyanate, 4,4'-diphenylenemethane diisocyanate, 4,4'-diphenylenepropane diisocyanate, etc.

Substituted isocyanates can also be employed, for example, substituted derivatives of the above and other compounds containing halogens, sulfur, oxygen, etc. containing groups for example:

1-chloro-2,4-phenylene diisocyanate

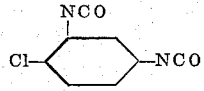

Dimethoxy-4,4'-biphenylene diisocyanate

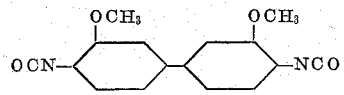

4,4'-sulfonylbis(phenyl isocyanate)

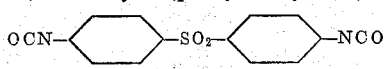

etc.

The diisocyanates of the types listed in the above paragraph are the ones which are most preferred for purposes of this invention. Examples of compounds containing more than two reactive groups of formula —X=C=Y and of the preferred subgenus —N=C=O which can be used, there may be mentioned 1,2,4-benzene triisocyanate and butane-1,2,2-triisocyanate.

Of course, it should be remembered that the polyisothiocyanates may be used instead of the polyisocyanates and representative examples would be those given above with the single change that the oxygen atom is substituted by sulfur.

For convenience of discussion where the term "isocyanates" is employed, it is not only employed specifically to illustrate isocyanates themselves but also as exemplary of other —X=C=Y compounds within the scope of this invention.

AMIDIFIED THEN ISOCYANATED OXIDIZED WAX PRODUCTS

As has been mentioned before, when the organic compounds of the X=C=Z type, or a combination of organic compounds of said type are reacted with amidified oxidized waxes, or a combination of amidified oxidized waxes, very useful products may be obtained.

The nature of the product is determined to a large extent by various reaction variables, for example the percent and type of diisocyanate, the degree of oxidation and amidification of the wax, the reaction time and temperature, etc.

The products prepared in this invention were tested for one or more properties and these will be outlined now for sake of clarity in the understanding of the effect of the reaction variables.

The melting point of the product is the continental solid point as described in Holde and Mueller, "Examination of Hydrocarbon Oils & Saponifiable Fats & Waxes," 2nd ed., New York, John Wiley & Sons, 1922. The penetration is determined by ASTM test method D5–25, using a 100-gram total weight for five seconds at 77° F. and the results are reported in tenths of a millimeter.

The ability of a wax to disperse carbon is determined by the following carbon dispersion test; a mixture containing 1.0–2.5 g. (4–10%) of wax on test and 20.5–19.0 g. (82–76%) of a 100 SUS viscosity mineral oil at 100° C. as exemplified by Texaco Ink Oil #538 is heated with stirring at 95–100° C. in a 500 ml. round bottom flask until a solution is obtained. To this solution is added 3.5 g. (14%) of a channel black such as exemplified by Kosmos 40 (United Carbon Co.) and approximately 20 g. of 3 mm. diameter glass beads. The mixture is then stirred at 95–100° C. for 30 minutes, using a stirrer which scrapes the side of the flask. A drop of the ink is placed on an absorption cell. This cell is fitted into a slide and through it a glycerol-water solution is circulated at 95° C. The sample is covered with a cover glass which is pressed and then viewed under a microscope at ×200. The inks are then classified as being types A, B, C, or D (type A describing the best dispersion) as described in the paper on the "Rheology of Carbon Paper Inks," by E. S. Gale and B. J. Staneslow, from the American Ink Maker of December 1950.

The oil retention penetration, which is a measure of the hardness of a wax-oil blend, is determined as follows: 25 grams of wax on test and 25 g. of a 100 SUS viscosity mineral oil as exemplified by Texaco Ink Oil #538 are placed in a 150 ml. beaker which is covered by a watch glass and placed in an oven at 100° C. for two hours. The sample, after stirring with a glass rod, is then poured into an aluminum foil dish (Fisher Scientific Co., Cat. No. 8–732), resting on asbestos and is covered by a 500 ml. beaker. After being allowed to stand for one hour, the sample is transferred to a water bath at 25.0° ±0.2° C. and kept there for 3–4 hours. A penetration is then taken on the sample with a standard ASTM needle under a total load of 100 g. for 5 seconds, and the results are reported in tenths of a millimeter (see ASTM test method D5–25).

The oil retention or the ability of a wax to hold oil in a wax-oil blend is determined by placing the wax-oil mold from the preceding test on a piece of filter paper after allowing the sample to remain at room temperature for one hour. A second piece of filter paper is placed on top of the wax-oil mold, and on top of this is placed a 100 gram distributed weight having the same cross-sectional dimensions as the wax mold. After one hour at room temperature, the bottom piece of filter paper is examined visually for oil bleed. If only a trace of oil is noticed, i.e., a ring of oil or a broken ring, having a thickness of less than a millimeter, it is classified as Type 1. If a ring is noted having a thickness of from one to five millimeters, it is classified as Type 2; if a ring of thickness from five to ten millimeters is observed, it is classified as Type 3; if the ring thickness is from 10 to 20 millimeters wide, it is classified as Type 4; and anything greater is classified as Type 5. Type 1 bleed would be considered good, Type 2 fair, and Types 3, 4 and 5 from poor to very poor.

In practice, from one to ten percent of diisocyanate by weight of amidified wax is reacted with the amidified oxidized wax to give a markedly improved product. Lesser or greater amounts may also be employed for certain applications. The preferred concentration of diisocyanate is from three to six percent. It has been found that the penetration of the product will gradually decrease, quite pronounced at first, as the percentage of diisocyanate is increased; however, with higher percentages of diisocyanate, some incompatability may be encountered. It is also observed that, at first, the oil retention penetration is lowered (the oil-wax blend is hardened), and as high percentages of diisocyanate are used (6 or 8 or higher percent) the oil retention penetration starts to increase. When insolubility is encountered it can oftentimes be lessened or eliminated by either rapid stirring or by adding the diisocyanate at a slower rate.

The reaction time and the reaction temperature also have an effect on the nature of the product. The preferred reaction time is from one to eight hours. The most pronounced changes in the nature of the product occur during the first hour or two and then there is a gradual improvement in some of the properties, i.e., penetration and oil retention penetration; and there may be a slight reduction in the dispersing ability of the product as the reaction time is prolonged. These reactions are normally carried out at temperatures just above the melting point of the wax on up to 140° C. and higher. It is preferable to carry out the reaction at lower temperatures so as to obtain products of lighter color and other slightly improved properties. Little discoloration of the amidified oxidized wax is obtained when it is reacted with diisocyanate at 90° C. but it is preferred to carry out the reaction at slightly higher temperatures for the sake of convenience.

Small amounts of water have little, if any, effect on the product. The effect of water on the reaction between isocyanate and oxidized wax is due primarily to the reactivity of the isocyanate and water. The oxidation of wax is known to cause the oxidized product to contain small amounts of water. However, the amidified product is dehydrated during the processing and is anhydrous. Water added in small quantities only effects the amount of isocyanate available for the reaction with the amidified wax. If water is added, this can be corrected by proportionately increasing the isocyanate on an equivalent basis.

Additives other than water can also be added in small concentrations such as urea, ammonium hydroxide, hydrochloric acid, hydrogen peroxide, hydrogen sulfide, ethylene diamine, ethanolamine, paraformaldehyde, and other low molecular weight compounds containing active hydrogens. When these materials are added in small quantities, for example from 0.05–0.5% useful products are obtained.

It is to be particularly noted that in order to achieve the superior products of this invention the oxidized wax is reacted with ammonia or amine prior to addition of the isocyanate. Addition of ammonia or amines during the isocyanate reaction without preforming the amide does not produce the superior products of this invention since a different type of product is formed, probably involving preferential reaction of the isocyanate with the amine or ammonia or simultaneous reaction of the isocyanate to a different degree with both the oxidized wax and the amine or ammonia. However, once oxidized wax is amidified, additional ammonia or amines or other compounds may be added during the isocyanate reaction, if desired.

One may also pre-react the diisocyanate with water, glycols such as ethylene glycol, propylene glycol, triethylene glycol, tetraethylene glycol, butylene glycol, and higher homologues and similar type compounds; diethylene glycol, dipropylene glycol, dibutylene glycol, and higher molecular weight compounds of this general type, analogous amine and amine alcohol type compounds; and, other polyhydric and/or polyamines. It is best to use an excess of a diisocyanate so that the resultant will have free isocyanate groups. These resultants can then be reacted with amidified oxidized waxes to yield improved products with properties approaching those of thermoplastics.

The nature of the amidified oxidized wax has an influence on the nature of the product. However, regardless of which amidified oxidized wax is used, there is a pronounced improvement in the hardness and other properties of the wax.

By the procedure of this invention, it has been possible to obtain a great improvement in the hardness of the wax, for example, an improvement in penetration of from 3 to ½; also, to achieve a reduction in the oil retention penetration of from greater than 150 to 40 and even less. In addition, most of the products of this invention show excellent oil retention and also have the ability to disperse carbon to a better extent than the original oxidized or the amidified oxidized wax or the oxidized wax isocyanate product, or even the natural waxes such as carnauba and ouricury. For many purposes, with these improvements in the amidified oxidized wax with a diisocyanate, it is possible to produce a synthetic wax which has all or most of the desirable characteristics of carnauba and ouricury for many applications and, in some characteristics, superior to the latter two waxes. Particular reference is made to a wax which may be used in various carbon paper ink formations which will be described later.

The following outlines some of the improvements effected by the present process over the corresponding unamidified isocyanated oxidized wax:

(1) The properties of amidified then isocyanated oxidized hydrocarbon wax are greatly superior to those of the corresponding unamidified product, for example, in respect to oil retention penetration, hardness, uniformity, etc.

(2) Amidified then isocyanated oxidized wax is more uniform than the corresponding unamidified product in respect to viscosity, stability, uniformity, and yields more uniform products made from said wax (such as carbon paper ink), etc., because amidifying more effectively modifies or removes thermally unstable constituents.

(3) Non solvent-extracted amidified, isocyanated oxidized microcrystalline wax is equal in quality to the solvent extracted, unamidified isocyanated oxidized wax, for example in respect to hardness, oil retention penetration, dispersion characteristics, etc.

Since solvent extraction of oxidized wax results in a large loss of wax (30–60% or more), amidifying the non-solvent extracted wax results in a large cost savings in producing a superior wax.

(4) In regard to odor level, the amidified, isocyanated oxidized wax is superior to the unamidified product. The intensity of odor is less and the type of odor is less offensive.

(5) Amidified, isocyanated oxidized wax is capable of producing a greater range of properties than can be achieved with the corresponding unamidified product, thus allowing a wide variety of products to be prepared having a wide variety of properties.

(6) The reaction of amidified oxidized wax with isocyanates is more effective in producing a wax of a thermoplastic type product than is achieved by reacting unamidified wax with isocyanate, employing the same percentage of isocyanate in both cases. For example, in the case of the present invention employing $NH_3$, about ½ of the isocyanate can effect the same results as can be effected with the corresponding unamidified wax. With increasing amounts of isocyanate, wax is increasingly changed from a wax type to a thermoplastic type product. The sharp melting point of wax gradually disappears with increasing amounts of isocyanate and a softening point is more descriptive of change on heating. The waxes become increasingly tough and leathery but still maintain homogeneity and are suitable for plastic molding applications.

The following examples illustrate more specifically what has been stated above. These reactions, characteristic of the present process, are carried out by first melting 300 grams of amidified oxidized wax in a glass reaction vessel. The temperature is held at 5° below the reaction temperature; for instance, 90° C. to 140° C., and the diisocyanate added rapidly. Normally, there is an exothermic reaction and the temperature rises 3 to 5° C. The reaction mixture, during the course of the reaction, is mechanically agitated with a metal stirrer. The results are summarized in the following table.

A summary or representative isocyanated amidified oxidized waxes is presented in the following table.

TABLE D

| Ex. | Amidified Oxidized Wax Ex. | Diisocyanate | | Reaction Conditions | | Oil Retention Penetration | Oil Retention-Penetration [1] of Unamidified Wax |
|---|---|---|---|---|---|---|---|
| | | Name | Percent | Time, Hrs. | Temp., °C. | | |
| 1d | 1c | TDI | 4 | 6 | 115 | 62 | 115 |
| 1dd | 1c | TDII | 4 | 6 | 115 | 75 | 140 |
| 1ddd | 1c | MDI | 5.6 | 4 | 125 | 60 | 110 |
| 2d | 2c | TDI | 4 | 6 | 115 | 60 | 80 |
| 2dd | 2c | TBDI | 6 | 5 | 110 | 62 | 78 |
| 2ddd | 2c | HMDI | 5 | 4 | 125 | 65 | 88 |
| 3d | 3c | TDI | 4 | 6 | 115 | 63 | 81 |
| 3dd | 3c | ClPDI | 4.8 | 8 | 100 | 66 | 75 |
| 3ddd | 3c | MBPDI | 7 | 4 | 125 | 55 | 71 |
| 4d | 4c | TDI | 4 | 6 | 115 | 41 | 105 |
| 4dd | 4c | MDI | 5.6 | 5 | 120 | 40 | 101 |
| 4ddd | 4c | TDI | 2 | 6 | 115 | 90 | 110 |
| 5d | 5c | TDI | 4 | 6 | 115 | 48 | 140 |
| 5dd | 5c | MDI | 5 | 4 | 130 | 42 | 120 |
| 6d | 6c | TDI | 4 | 6 | 115 | 50 | 108 |
| 6dd | 6c | TDII | 4 | 6 | 115 | 62 | 120 |
| 7d | 7c | TDI | 4 | 6 | 115 | 47 | 75 |
| 7dd | 7c | ClPDI | 5 | 5 | 125 | 53 | 78 |
| 8d | 8c | TDI | 4 | 6 | 115 | 50 | 140 |
| 8dd | 8c | TBDI | 6 | 5 | 125 | 46 | 140 |
| 3bcd | 3bc | TDI | 4 | 6 | 115 | 35 | 45 |
| 3bcdd | 3bc | TDII | 4 | 8 | 125 | 46 | 53 |
| 6bcd | 6bc | TDI | 4 | 6 | 115 | 32 | 43 |
| 6bcdd | 6bc | TDII | 5 | 8 | 100 | 41 | 54 |
| 7bcd | 7bc | TDI | 4 | 6 | 115 | 32 | 41 |
| 4ccd | 4cc | TDI | 4 | 6 | 115 | 45 | 80 |
| 4ccdd | 4cc | HMDI | 6 | 6 | 125 | 60 | 102 |
| 4cccd | 4ccc | TDI | 4 | 6 | 115 | 48 | 80 |
| 9cd | 9c | TDI | 4 | 6 | 115 | 42 | 53 |
| 10cd | 10c | TDI | 4 | 6 | 115 | 68 | 87 |
| 11cd | 11c | TDI | 4 | 6 | 115 | 85 | 130 |

[1] Corresponding isocyanated waxes prepared in the manner of U.S. Patents 2,890,124-5 without amidification, all other steps being the same.

Symbols employed in above table and elsewhere in this application are as follows:

| Symbol | Name | Formula |
|---|---|---|
| TDI | Toluene-2,4-diisocyanate | $CH_3-C_6H_3(NCO)_2$ (2,4-) |
| TDII | 65% toluene-2,4-diisocyanate | $CH_3-C_6H_3(NCO)_2$ (2,4-) |
| | 35% toluene-2,6-diisocyanate | $CH_3-C_6H_3(NCO)_2$ (2,6-) |
| MDI | Diphenylmethane-4,4-diisocyanate | $OCN-C_6H_4-CH_2-C_6H_4-NCO$ |

| Symbol | Name | Formula |
|---|---|---|
| NDI | Naphthylene-1,5-diisocyanate | (naphthalene with NCO at 1 and 5 positions) |
| TBDI | 3,3'-bitoluene-4,4-diisocyanate | $OCN-C_6H_3(CH_3)-C_6H_3(CH_3)-NCO$ |
| HMDI | Hexamethylene diisocyanate | $OCN(CH_2)_6NCO$ |
| ClPDI | 1-chloro-2,4-phenylene diisocyanate | $Cl-C_6H_3(NCO)-NCO$ |
| MBPDI | 3,3-dimethoxy-4,4'-biphenylene diisocyanate | $OCN-C_6H_3(OCH_3)-C_6H_3(OCH_3)-NCO$ |

USES

This section deals with the utilization of amidifed then isocyanated oxidized waxes in carbon paper inks. There are several articles, patents, and other published literature which discuss various types of carbon paper, particularly in regard to formulation of the various ingredients, test procedures, utilization of various waxes, etc. See, for example, U.S. Patent No. 2,426,248, dated August 26, 1947, to Sugarman; Chapter 12 entitled "Carbon Papers and Other Duplicating Papers," by R. R. Wissinger in the book edited by R. H. Mosher entitled "Specialty Papers," published by the Chemical Publishing Co., New York, in 1950; the paper on the "Rheology of Carbon Paper Inks," by E. S. Gale and B. J. Staneslow, in the American Ink Maker issue of December 1950; the paper on "Converting of Carbon Papers," by F. B. McFarland, in the Paper Trade Journal, volume 137, pages 230-237 (1953); and the book Commercial Waxes, by H. Bennett, pages 368, 377 and 429-431, published by Chemical Publishing Co., New York, in 1944.

There are many different types of carbon paper and related materials in use today. The three most widely used types of carbon paper are the one-time carbon which is used once and then thrown away, the pencil carbon which may also be used once, or may be used many times, and the typewriter carbon. The one-time carbon is the most widely used type of carbon paper and it finds wide application in business and multiple forms and other applications. In the production of one-time carbon paper, cost is all important. On the other hand, for typewriter carbons, quality rather than cost is important, and for pencil carbons, cost and quality are intermediate in importance.

The carbon paper ink may be viewed simply as a mixture containing a wax, an oil, a pigment and a dye. The oil serves as the vehicle and the pigment and dye give the color and some of the body. Most of the desirable characteristics in the finished ink must be supplied by the wax and these will be described later. Other materials may also be used in carbon paper to give it certain properties. For example, petrolatum may be used as part or all of the vehicle to impart certain properties such as plasticity and toughness, and paraffin wax may be used as a substitute for part of the wax to give a cheaper formulation. One of the unique properties of many of the waxes described in this invention is that they are able to carry a lot of paraffin wax into the ink formulation without detracting greatly from the desirable characteristics required. In this respect, these products are comparable to carnauba and ouricury and superior to montan, and the precursor oxidized hydrocarbon material or the amidifed oxidized waxes. Other materials may be used in carbon paper inks such as clay to cheapen the formula, oleic acid which acts as a dye solubilizer, rubbers to give toughness, dispersing agents, etc.

The consistency and other properties of the ink can be varied to a certain degree by the choice of the oil which is used. For example, various oils ranging from a relatively light mineral oil (100 SUS at 100° F.) up to heavy oils and petrolatums may be used. These oils and petrolatums may be colorless or range in color up to black. The darker colored materials are generally better dispersants for the pigment.

There are numerous pigments which may be used in typical formulations. The most common pigment is carbon black and this comes in numerous grades such as channel blacks, furnace blacks, etc., and each of these grades come in many modifications. The channel blacks are, in general, the most desirable as far as quality is concerned, but on the other hand, they are also the most expensive. The high-grade channel blacks have an oxygenated surface which aids in its dispersion and which can absorb the dye and other materials. As one goes down the scale of carbon blacks, lesser amounts of this very desirable oxygenated surface are encountered. Blue pigments may also be used, such as Milori Blue, and others, as can many other blue pigments. Numerous other colored pigments may also be used as described in the literature.

Many dyes are commonly employed in carbon paper inks. The common ones are Methyl Violet, Nigrosine, Victoria Blue, etc., and salts of these materials. It is advantageous to use a dye which is soluble in the wax, but if this is impossible, a solubilizer may be used. One of the advantages of using products of this invention is that the dye is soluble in the wax and no solubilizer is necessary. In general, any solubilizer, which is used will detract from the qualities of the finished ink, i.e., will cause dye bleed, soften the ink, cause frosting, etc. In some instances it is possible to completely eliminate the dye, but this is the exception rather than the rule.

A wax, to be useful for this purpose, must have many specific properties when used in small concentration in the finished ink; for example, in concentrations of from 8% to 12% in one-time carbon paper inks, or in higher percentages, up to 30% or 40%, in typewriter carbons.

It seems that most of the desirable characteristics required in a one-time carbon paper ink must be imparted by small percentages of wax. This is particularly true of one-time carbon paper inks. Since these waxes must have so many specific characteristics, which seem to be specific for only carnauba and ouricury wax, it is not surprising that these two natural waxes are widely used as one of the components of carbon paper inks and that there are no synthetic materials which can completely replace these materials in the percentages in which they are used. It was quite surprising that many of the products of this invention have a combination of all the desirable characteristics required and that the materials served as complete replacements for the expensive natural waxes, carnauba and ouricury in many applications and in some respects these waxes are actually superior to the two natural waxes.

To be useful for carbon paper inks a wax must be able to dissolve the dye, such as Methyl Violet, Victoria Blue, Nigrosine, etc., preferably without the addition of a solubilizer, such as oleic acid. In this respect, the waxes of this invention are much superior to the natural waxes carnauba, ouricury, and montan which are almost universally used in one-time carbons. A wax must also produce good flow in a one-time carbon paper ink so that a thin uniform coating can be obtained. To produce good flow, a wax should give an ink of low viscosity, no thixotropy and no yield value (be Newtonian). The dispersion of the carbon black and the viscosity of the wax are the important variables which influence the flow of the finished ink. The ability of a wax to disperse carbon can be measured by the procedure described by Gale and Staneslow in the aforementioned article. If a wax gives B-type dispersion or better, at 6%, no flow difficulties would be expected. Also, in this respect, many of the products of this invention are equal to or superior to the natural waxes ouricury, carnauba and montan, and as a group far better than the unamidified, isocyanated oxidized waxes.

A wax must also yield a finished ink which is hard and which will not bleed oil. These properties can be easily tested, at least to a certain degree, by determining the oil retention penetration and the oil retention of a wax oil blend. In this respect, the waxes of this invention show great value and are comparable, in some cases superior, to carnauba, ouricury and montan. This is the one property which in the past has been so hard to duplicate.

It was quite unpredictable that, when amidified oxidized wax is reacted with a diisocyanate, a new material could be formed which had a combination of all the desirable properties which are necessary for a carbon paper ink, and that these properties are in general superior to the corresponding unamidified products described in U.S. Patents 2,890,124–5. Following is a formulation employing waxes of this invention for a one-time carbon of medium intensity:

*Carbon Paper Ink 1*

| Material: | Grams |
|---|---|
| Amidified then isocyanated oxidized wax (Ex. 4d) | 12 |
| Paraffin wax (M.P. approx. 135° F.) | 20 |
| Carbon black | 17 |
| Methyl Violet | 1 |
| Mineral oil | 50 |

The paraffin wax used is a high-melting-point paraffin and the oil is a 100-second oil at 100° F. The carbon black can be a channel black such as exemplified by Peerless Beads or a cheaper channel black such as Raven 15, manufactured by Columbian Carbon Company, or a furnace black as exemplified by Statex B–12 manufactured by Columbian Carbon Company. Considering cost and the properties of the finished ink, the best of the above blacks is Raven 15.

The above formulation may be modified in several ways to give different intensities and grades of ink; for example clay can be substituted for some of the carbon black and oil to cheapen the formula without greatly impairing quality, and other variations in the proportions of wax may be made.

A similar one-time carbon paper formulation employing clay is as follows:

*Carbon Paper Ink 2*

| Material: | Grams |
|---|---|
| Amidified then isocyanated oxidized wax (Ex. 7d) | 12 |
| Paraffin wax (M.P. approx. 135° F.) | 25 |
| Methyl Violet hydrochloride | 0.5 |
| Nigrosine base | 1 |
| ASP–100 clay | 18 |
| Carbon black | 10 |
| 300 sec. mineral oil | 17 |
| Petrolatum | 16.5 |

One type of carbon black which may be used is a channel black such as Peerless Beads or a cheaper channel black such as Raven 15 or comparable products, or mixtures of these. These waxes also find use in other types of carbon paper and ribbons such as pencil carbons, typewriter ribbons, etc. A typical one-time medium blue pencil carbon formulation is as follows:

*Carbon Paper Ink 3*

| Material: | Grams |
|---|---|
| Amidified then isocyanated oxidized wax (Ex. 3bcd) | 12 |
| Paraffin wax (M.P. approx. 135° F.) | 25 |
| ASP–100 clay | 18 |
| Milori blue | 20 |
| 300 sec. mineral oil | 13 |
| Petrolatum | 12 |

A typical typewriter formulation is as follows:

*Carbon Paper Ink 4*

| Material: | Grams |
|---|---|
| Amidified then isocyanated oxidized wax (Ex. 8dd) | 25 |
| Carbon black ("Raven 15") | 18 |
| Methyl Violet | 1 |
| Paraffin wax (M.P. approx. 135° F.) | 10 |
| 300 sec. mineral oil | 16 |
| Petrolatum | 30 |

As above, this formulation may be modified in many ways to obtain carbon paper ink to fit individual uses.

These inks may be prepared either in a ball mill or a three-roll mill by conventional procedures using temperatures of from approximately 190° F. to 220° F. Care must be taken when certain dyes are used not to exceed these temperatures; otherwise, the dye will decompose. These finished inks can be coated onto paper using a Mayer type coater or comparable equipment. Normally, it is best to apply approximately 2.5 lbs. of wax per ream for one-time carbons and higher quantities for typewriter carbons.

If any of the waxes described in U.S. Patents 2,890,124 and 2,890,125 are substituted for the waxes of this invention in the above carbon paper ink formulations, these formulations are, among other things, (1) Softer (for example, as measured by oil retention penetration).
(2) More viscous.
(3) More tacky.
(4) More thixotropic.
(5) Less heat stable.
(6) Of a higher odor level.

Since non-solvent-extracted wax is less expensive than the corresponding solvent-extracted wax since great losses of wax are experienced in solvent extracting, and since non-solvent-extracted wax can be upgraded to the properties of solvent extracted wax by amidifying prior to isocyanation, an improved wax can be prepared from a much less costly wax.

The following Table E illustrates the superiority of the waxes of the present invention over the corresponding unamidified waxes. All products are prepared employing 4% TDI at a reaction temperature of 115° C. for a reaction time of six hours. E1 through E6 are isocyanated amidified oxidized waxes of this invention whereas E1a through E6a are the unamidified isocyanated oxidized waxes of U.S. Patents 2,890,124-5.

EXAMPLE E

| Ex. | Starting Wax | Oxidized Wax | | Percent N of Amidified Wax | Oil Retention-Penetration | Heat Ageing Stability | Thixotrophy of Ink | Odor |
|---|---|---|---|---|---|---|---|---|
| | | Acid No. | Sap. No. | | | | | |
| E1 | Tank Bottom Microcrystalline. | 23 | 54 | 0.85 | 42 | Excellent | Negligible | Slight. |
| E1a | ----do---- | 23 | 54 | Unamidified | 90 | Poor | High | Heavy, rancid. |
| E2 | ----do---- | 15 | 42 | 0.65 | 45 | Excellent | Negligible | Slight. |
| E2a | ----do---- | 15 | 42 | Unamidified | 130 | Poor | High | Heavy, rancid. |
| E3 | ----do---- | 10 | 30 | 0.45 | 55 | Excellent | Negligible | Odorless. |
| E3a | ----do---- | 10 | 30 | Unamidified | 140 | Poor | High | Heavy, rancid. |
| E4 | Tank Bottom Microcrystalline (Solvent Extracted) | 26 | 60 | 0.87 | 35 | Excellent | ----do---- | Odorless. |
| E4a | | 26 | 60 | 0.87 | 45 | Fair | Fair | Heavy, rancid. |
| E5 | Fisher-Tropsch | 25 | 60 | 0.84 | 43 | Excellent | Negligible | Slight. |
| E5a | ----do---- | 25 | 60 | Unamidified | 85 | Poor | High | Heavy, rancid. |
| E6 | (Solvent Extracted) Fisher-Tropsch | 23 | 55 | 0.80 | 36 | Excellent | Negligible | Odorless. |
| E6a | | 23 | 55 | Unamidified | 47 | Fair | Fair | Heavy, rancid. |

*Heat ageing.*—This test is to determine if there are any heat sensitive elements in the wax which would change on heating and thus affect the viscosity of the wax. The wax is simply melted and held at elevated temperatures for an extended period of time. The viscosity of the wax is taken initially and after 6, 12, 18, 24 hours of heat treatment. Temperatures of 125° and 150° C. are used. If the wax shows little or no change in viscosity it is classed as excellent, fair is moderate change and poor is a large change.

*Thixotropy.*—Essentially this is the same test as above but on the whole ink. However, rheological factors are dominant in this instance. The ink is held at an elevated temperature (220° F.) for an extended length of time with viscosity measurements taken initially and at 12 and 24 hour intervals. If the viscosity of the ink shows little or no change this characteristic is classed as excellent, fair is moderate change and poor is a large change.

OTHER USES

This section deals with other uses for the amidified then isocyanated oxidized waxes of this invention.

Because of the very desirable properties, particularly in reference to the excellent hardness of the products of this invention, they are useful for blending with other materials to impart their favorable properties, for example; they may be blended in small concentrations with paraffinic type waxes to yield blends with improved hardness and increased melting point. One specific application in this line would be to blend 3–10% of the hard products described in this application with paraffin wax to yield a product with better blocking characteristics.

One of the important uses for amidified then isocyanated oxidized waxes is for various types of polishes; for instance, floor polish, shoe polish, furniture polish, and automobile polish.

A typical formulation in which these products have found use in the field of emulsion floor polishes is as follows:

*Floor Polish*

| Material: | Grams |
|---|---|
| Amidified then isocyanated oxidized wax (Ex. 4d) | 50 |
| "Durez 219" | 50 |
| Oleic acid | 10 |
| 2-amino-2-methyl-1-propanol | 6 |
| Borax | 4 |
| Water | 830 |

The first three ingredients in the above formulation are blended at temperature up to but not exceeding 350° F. The mixture is cooled to 210° F. with agitation. The 2-amino-2-methyl-1-propanol is added with stirring at 200 to 210° F. followed immediately by the borax in a saturated solution. The resulting mixture is heated with stirring at 200° F. to a maximum of 210° F. for five minutes and then the wax melt is slowly poured into water at 200° F. with rapid agitation. When the emulsion has smoothed out, 10–20% of a cold solution of leveling agent is added during agitation and cooled to room temperature. A leveling agent which may be used is a 12% ammoniacal shellac solution prepared by dissolving 109 g. of refined dewaxed shellac in a solution of 26 g. of 26° Bé. (28%) ammonia in 722 g. of water.

"Durez 219" is a terpene-phenolic, oil soluble, high melting, low viscosity, thermoplastic resin having a melting point (capillary) of 130–136° C., an acid number of from 60 to 70, a specific gravity at 25° C. of 1.09 and a refractive index of 1.552. It is manufactured and supplied by the Durez Plastic and Chemicals Division of Hooker Electrochemical Co.

Many modifications of the above formulation can be made; for instance, the resin can be eliminated or other resins substituted for the above. Other waxes can be used in conjunction with the above or the products of the other examples in this invention can be used.

The above polish formulation, when spread on linoleum, asphalt tile, rubber tile, vinyl tile, etc., yields a film which when dried, is very hard, scuff- and abrasion-resistant with a high gloss and with good water resistance, and each of these properties is superior to that obtainable using the starting oxidized microcrystalline wax. The resulting wax film is harder and more scuff resistant than obtainable by the corresponding products of U.S. Patents 2,890,124 and 2,890,125.

A good no-rub automobile polish and furniture polish can be prepared from the following formulations and procedures:

*Automobile Polish*

| Material: | Grams |
|---|---|
| Amidified then isocyanated oxidized wax (Ex. 4d) | 3.0 |
| Silicone (5000 cs. visc.) | 3.6 |
| Oleic acid | 3.6 |
| Morpholine | 1.7 |
| Mineral spirits (boiling point 275–325° F.) | 67.5 |
| Water | 40.0 |

The wax, silicone and oleic acid are dissolved in the mineral spirits. From this beginning the emulsion may be formed by the wax to water technique as outlined under the emulsion polish procedure. A suitable 5000 cs. viscosity silicone would be Linde L-41 diethyl silicone oil sold by Linde Air Products Co., Division of Union Carbide and Carbon Corporation.

These last two formulas make good high-gloss polishes of the no-rub, quick-drying type. Most silicone polishes require thorough cleaning of the surface of application for best results. With clean surfaces the polish is spread smoothly, allowed to dry to a powdery film and the film wiped off, leaving a high gloss with no rubbing.

The ratio of silicone to wax should be maintained while the variation in the total solids (wax in silicone) is between four and ten percent.

Following is a formulation for the manufacture of a shoe polish wax employing a wax of this invention:

*Shoe Polish*

| Material: | Grams |
|---|---|
| Paraffin wax (131–133° F.) | 12 |
| Amidified then isocyanated oxidized wax (Ex. 1dd) | 13 |
| Turpentine | 15 |
| Mineral spirits | 60 |

The first two ingredients are melted together and to this blend the last two materials are added. After a solution is obtained, the polish is poured at a temperature just above the point in which the wax starts to separate. Depending upon the color of the finished product, any of several dyes may be used, the main criteria being that of solubility.

In any of these formulations, oftentimes other products from this invention other than those specifically mentioned may be used, but generally in these cases, slight modifications may become necessary. These modifications can be made without too much difficulty by those who are skilled in the art. The above formulations are very good starting points and these formulas can be altered or modified in any of many ways.

The compositions of this invention can be employed as thermoplastic polymers. They can be molded, extruded, formed into sheets and films, filaments, etc. These sheets and films, and filaments can be strengthened by orienting their crystal structure by stretching, etc.

*Example*

The compositions of Example 4d can be heat molded. Filaments are prepared by drawing from a hot melt. Films are prepared by extrusion. Copper wires are coated with the product.

The above are examples of uses for the oxidized, amidified, isocyanated products of this invention. In addition, they can be used in place of, or in conjunction with, other waxes.

Having thus described my invention, what I claim as new and desire to obtain by Letters Patent is:

1. The product obtained by
   (A) oxidizing a non-benzenoid hydrocarbon wax having a melting point of about 120° F. to about 230° F. so as to yield an oxidized wax having an acid number of about 10 to about 60 and a saponification number of about 30 to about 150;
   (B) reacting said so-oxidized wax with an amine selected from the group consisting of ammonia and an organic amine within the temperature range of at least 100° C.–300° C. to produce an amine-modified oxidized wax containing about 0.2 to 2.0% nitrogen by weight thereof;
   (C) reacting said amine-modified oxidized wax with 1–10% by weight thereof of a member selected from the group consisting of organic polyisocyanates and organic polyisothiocyanates wherein the isocyanato and thioisocyanato groups are the sole reacting groups.

2. The product of claim 1 wherein the organic polyisocyanate is a diisocyanate.

3. The product of claim 2 wherein the oxidized wax has an acid number of 20 to 40 and a saponification number of about 50 to 100, the amine-modified oxidized wax contains about 0.5 to 1.0% nitrogen by weight thereof, and said amine-modified oxidized wax is reacted with 3 to 6% by weight thereof of said diisocyanate.

4. The product of claim 1 wherein said amine is ammonia.

5. The product of claim 2 wherein said amine is ammonia, said ammonia-modified oxidized wax contains about 0.5 to 1% nitrogen by weight thereof, and said ammonia-modified oxidized wax is reacted with about 3 to 6% by weight thereof said diisocyanate.

6. The product of claim 4 wherein the non-benzenoid hydrocarbon wax is a microcrystalline wax.

7. The product of claim 2 wherein the non-benzenoid hydrocarbon wax is a microcrystalline wax, said amine is ammonia, and said diisocyanate is an aryl diisocyanate.

8. The product of claim 3 wherein the non-benzenoid hydrocarbon wax is a microcrystalline wax, the amine is ammonia, and the diisocyanate is a phenylene diisocyanate.

9. The product of claim 8 wherein the diisocyanate is a toluene diisocyanate.

10. A carbon paper ink containing a coloring material, a vehicle and the product of claim 1.

11. A carbon paper ink containing a coloring material, a vehicle and the product of claim 2.

12. A carbon paper ink containing a coloring material, a vehicle and the product of claim 3.

13. A carbon paper ink containing a coloring material, a vehicle and the product of claim 4.

14. A carbon paper ink containing a coloring material, a vehicle and a product obtained by
   (A) oxidizing a non-benzenoid hydrocarbon wax having a melting point of about 120° F. to about 230° F. so as to yield an oxidized wax having an acid number of about 10 to about 60 and a saponification number of about 30 to about 150;
   (B) reacting said so-oxidized wax with ammonia within the temperature range of at least 100° C.–300° C. to produce an ammonia-modified oxidized wax containing about 0.2 to 2.0% nitrogen by weight thereof;
   (C) reacting said ammonia-modified oxidized wax with 1 to 10% by weight thereof of a diisocyanate wherein the isocyanato groups are the sole reacting groups.

15. A carbon paper ink containing a coloring material, a vehicle and a product obtained by
   (A) oxidizing a non-benzenoid hydrocarbon wax having a melting point of about 120° F. to about 230° F. so as to yield an oxidized wax having an acid number of 20 to 40 and a saponification number of about 50–100;
   (B) reacting said so-oxidized wax with ammonia within the temperature range of at least 100° C.–300° C. to produce an ammonia-modified oxidized wax containing about 0.5–1.0% nitrogen by weight thereof;
   (C) heating said ammonia-modified oxidized wax with 3 to 6% by weight thereof of a diisocyanate wherein the isocyanato groups are the sole reacting groups.

16. A carbon paper ink containing a coloring material, a vehicle and the product of claim 6.

17. A carbon paper ink containing a coloring material, a vehicle and the product of claim 7.

18. A carbon paper ink containing a coloring material, a vehicle and the product of claim 8.

19. A carbon paper ink containing a coloring material, a vehicle and the product of claim 9.

References Cited by the Examiner

UNITED STATES PATENTS

| 2,890,124 | 6/59 | Mange | 260—77.5 |
| 2,890,125 | 6/59 | Mange | 260—77.5 |

LEON J. BERCOVITZ, *Primary Examiner.*

H. N. BURSTEIN, *Examiner.*